US012750747B2

(12) United States Patent

Basu Mallick et al.

(10) Patent No.: US 12,750,747 B2

(45) Date of Patent: Sep. 29, 2026

(54) HANDOVER EXECUTION FOR MOBILITY USING LOWER LAYERS

(71) Applicant: Lenovo (Singapore) Pte. Limited, Singapore (SG)

(72) Inventors: Prateek Basu Mallick, Dreieich (DE); Joachim Löhr, Wiesbaden (DE)

(73) Assignee: Lenovo (Singapore) Pte. Limited, Singapore (SG)

(*) Notice: Subject to any disclaimer, the term of this patent is extended or adjusted under 35 U.S.C. 154(b) by 217 days.

(21) Appl. No.: 18/883,784

(22) Filed: Sep. 12, 2024

(65) Prior Publication Data

US 2025/0097802 A1 Mar. 20, 2025

Related U.S. Application Data

(60) Provisional application No. 63/582,555, filed on Sep. 14, 2023.

(51) Int. Cl.

| | |
|---|---|
| ***H04W 36/12*** | (2009.01) |
| ***H04L 1/1812*** | (2023.01) |
| ***H04L 1/1822*** | (2023.01) |
| ***H04W 36/00*** | (2009.01) |
| ***H04W 36/08*** | (2009.01) |

(52) U.S. Cl.

CPC ........... *H04W 36/12* (2013.01); *H04L 1/1812* (2013.01); *H04L 1/1822* (2013.01); *H04W 36/0072* (2013.01); *H04W 36/08* (2013.01)

(58) Field of Classification Search

CPC . H04W 36/08; H04W 36/12; H04W 36/0072; H04L 1/1812; H04L 1/1822

See application file for complete search history.

(56) References Cited

U.S. PATENT DOCUMENTS 12,047,958 B2 * 7/2024 Jiang ..................... H04L 5/0055
12,549,926 B2 * 2/2026 Kim ...................... H04L 1/1832
12,621,837 B2 * 5/2026 Li ..................... H04W 36/0079

(Continued)

FOREIGN PATENT DOCUMENTS

WO 2025057137 A1 3/2025

OTHER PUBLICATIONS

CN120883553A (Year: 2025).*

"International Search Report and Written Opinion", International Application No. PCT/IB2024/058947, Jan. 2, 2025, 10 pages.

*Primary Examiner* — Charles R Craver

(74) *Attorney, Agent, or Firm* — FIG. 1 Patents

(57) ABSTRACT

Various aspects of the present disclosure relate to active radio notification for paging. An apparatus, such as a user equipment (UE), transmits control signaling indicating completion of a handover procedure based on executing a handover procedure between a serving base station and a target base station. The first control signaling is associated with a first hybrid automatic repeat request (HARQ) identifier (ID). The UE monitors for a downlink control channel message including an uplink grant associated with a second HARQ ID. A target base station may transmit the downlink control channel message with a HARQ ID that matches the first HARQ ID or with a HARQ ID that is different from the first HARQ ID. The UE determines, based on the first HARQ identifier having a same value as the second HARQ identifier, an indication that the handover procedure is complete.

20 Claims, 8 Drawing Sheets

(56) References Cited

U.S. PATENT DOCUMENTS

| | | | |
|---|---|---|---|
| 2015/0195850 | A1 | 7/2015 | Quan et al. |
| 2020/0296759 | A1* | 9/2020 | Agiwal ................. H04L 1/1822 |
| 2020/0303000 | A1* | 9/2020 | Takahashi .............. G11C 16/10 |
| 2020/0344810 | A1* | 10/2020 | Xiong ................... H04L 1/1861 |
| 2020/0351731 | A1* | 11/2020 | Kim .................. H04W 36/0058 |
| 2020/0396024 | A1* | 12/2020 | Ganesan ............... H04L 1/1864 |
| 2022/0174555 | A1* | 6/2022 | Tamaki ............. H04W 36/0011 |
| 2022/0217594 | A1* | 7/2022 | Kim .................. H04W 36/0079 |
| 2022/0295541 | A1* | 9/2022 | Agiwal ................. H04L 1/1822 |
| 2023/0015847 | A1 | 1/2023 | Li |
| 2024/0283580 | A1* | 8/2024 | Ugurlu .............. H04W 72/1268 |
| 2024/0381130 | A1* | 11/2024 | Zhang ................... H04W 24/10 |
| 2025/0048209 | A1* | 2/2025 | Song ............... H04W 36/00692 |

* cited by examiner

800

HANDOVER EXECUTION FOR MOBILITY USING LOWER LAYERS

RELATED APPLICATION

This application claims priority to U.S. Provisional Application Ser. No. 63/582,555 filed Sep. 14, 2023, entitled "HANDOVER EXECUTION FOR MOBILITY USING LOWER LAYERS," the disclosure of which is incorporated by reference herein in its entirety.

TECHNICAL FIELD

The present disclosure relates to wireless communications, and more specifically to handover mobility.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communications system (e.g., time resources (e.g., symbols, slots, subframes, frames, or the like)) or frequency resources (e.g., subcarriers, carriers, or the like). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

A UE in a wireless communications system may move across coverage areas of different network devices. For example, a UE may move from a coverage area of a first base station to a coverage area of second base station. To ensure continuous service, the UE and the base stations can coordinate to perform a handover procedure, in which the UE establishes a connection with a target base station (e.g., the second base station).

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Further, as used herein, including in the claims, a "set" may include one or more elements.

Some implementations of the method and apparatuses described herein may include a UE for wireless communication to transmit, based on executing a handover procedure between a serving base station and a target base station, first control signaling indicating completion of the handover procedure, the first control signaling associated with a first hybrid automatic repeat request (HARQ) identifier (ID), monitor, in response to the first control signaling, for a downlink control channel message including an uplink grant associated with a second HARQ ID, and determine, based on the first HARQ ID having a same value as the second HARQ ID, that the handover procedure is complete.

In some implementations of the method and apparatuses described herein, the UE receives a lower layer mobility command, where the first control signaling is transmitted responsive to the lower layer mobility commanding to the uplink transmission, and transmits, using the scheduling information, an indication of successful completion of lower layer mobility based on receiving the downlink control channel message. The UE cancels, based on failing to receive the downlink control channel message, an uplink transmission associated with the uplink grant. Additionally, or alternatively, the UE transmits, based on receiving the downlink control channel message, an uplink transmission associated with the uplink grant. The UE receives, prior to transmitting the first control signaling, second control signaling indicating scheduling information corresponding to the first control signaling, the first control signaling transmitted in accordance with the scheduling information corresponding to the first control signaling. The second control signaling includes a radio resource control (RRC) reconfiguration message. The UE transmits, in accordance with the scheduling information and based on failing to receive the downlink control channel message, a retransmission of the first control signaling. The UE initiates a timer based on transmitting the first control signaling, where the retransmission is transmitted until expiry of the timer.

The UE receives, in response to the retransmission of the first control signaling, the downlink control channel message including the uplink grant, and transmits the uplink transmission based on receiving the downlink control channel message. The UE receives second control signaling indicating the target base station, the target base station selected from a plurality of candidate target base stations, where executing the handover procedure between the serving base station and the target base station is based on receiving the second control signaling. The second control signaling includes a lower layer mobility command message. Additionally, or alternatively, the second control signaling includes one or more of a target frequency of the target base station, a cell identity of the target base station, a physical beam indication, or a timing advance to be used for transmission of the first control signaling. The UE receives the downlink control channel message, the downlink control channel message associated with a cell-radio network temporary ID (C-RNTI), releases one or more resources associated with transmitting the first control signaling, and transmits, using the uplink grant, second control signaling. The second control signaling includes the C-RNTI.

Additionally, or alternatively, the second control signaling includes a parameter indicating the handover procedure is complete. Additionally, or alternatively, the second control signaling includes a measurement report based on a measurement configuration associated with the serving base station. The UE receives signaling indicating scheduling information for an additional uplink transmission, the signaling associated with a third HARQ ID different from the first HARQ ID and continues to monitor for the downlink control channel message. The UE receives, prior to transmitting the first control signaling, second control signaling indicating configuration information associated with the downlink control channel message. The downlink control channel message includes an explicit indication that transmission of the first control signaling is successful. Additionally, or alternatively, reception of the downlink control channel message implicitly indicates that transmission of the first control signaling is successful. Additionally, or alternatively, the first control signaling includes an RRC reconfiguration complete message.

Some implementations of the method and apparatuses described herein may further include a processor for wireless communication to transmit, based on executing a handover procedure between a serving base station and a target base station, first control signaling indicating completion of the handover procedure, the first control signaling associated with a first HARQ ID, monitor, in response to the first control signaling, for a downlink control channel message including an uplink grant associated with a second HARQ ID, and determine, based on the first HARQ ID having a same value as the second HARQ ID, that the handover procedure is complete.

In some implementations of the method and apparatuses described herein, the processor receives a lower layer mobility command, where the first control signaling is transmitted responsive to the lower layer mobility command. Additionally, or alternatively, the processor cancels, based on failing to receive the downlink control channel message, an uplink transmission associated with the uplink grant. Additionally, or alternatively, the processor transmits, based on receiving the downlink control channel message, an uplink transmission associated with the uplink grant. The processor receives, prior to transmitting the first control signaling, second control signaling indicating scheduling information corresponding to the first control signaling, the first control signaling transmitted in accordance with the scheduling information corresponding to the first control signaling. The second control signaling includes an RRC reconfiguration message. The processor transmits, in accordance with the scheduling information and based on failing to receive the downlink control channel message, a retransmission of the first control signaling. The processor initiates a timer based on transmitting the first control signaling, where the retransmission is transmitted until expiry of the timer.

The processor receives, in response to the retransmission of the first control signaling, the downlink control channel message including scheduling information for the uplink transmission, where the first HARQ ID is the same as the second HARQ ID and transmits the uplink transmission based on receiving the downlink control channel message. The processor receives second control signaling indicating the target base station, the target base station selected from a plurality of candidate target base stations, where executing the handover procedure between the serving base station and the target base station is based on receiving the second control signaling. The second control signaling includes a lower layer mobility command message. Additionally, or alternatively, the second control signaling includes one or more of a target frequency of the target base station, a cell identity of the target base station, a physical beam indication, or a timing advance to be used for transmission of the first control signaling. The processor receives the downlink control channel message, the downlink control channel message associated with a C-RNTI, releases one or more resources associated with transmitting the first control signaling, and transmits, using the uplink grant, second control signaling. The second control signaling includes the C-RNTI.

Additionally, or alternatively, the second control signaling includes a parameter indicating the handover procedure is complete. Additionally, or alternatively, the second control signaling includes a measurement report based on a measurement configuration associated with the serving base station. The processor receives signaling indicating scheduling information for an additional uplink transmission, the signaling associated with a third HARQ ID different from the first HARQ ID and continues to monitor for the downlink control channel message. The processor receives, prior to transmitting the first control signaling, second control signaling indicating configuration information associated with the downlink control channel message. The downlink control channel message includes an explicit indication that transmission of the first control signaling is successful. Additionally, or alternatively, reception of the downlink control channel message implicitly indicates that transmission of the first control signaling is successful. Additionally, or alternatively, the first control signaling includes an RRC reconfiguration complete message.

Some implementations of the method and apparatuses described herein may further include a method performed by a UE, the method including transmitting, based on executing a handover procedure between a serving base station and a target base station, first control signaling indicating completion of the handover procedure, the first control signaling associated with a first HARQ ID, monitoring, in response to the first control signaling, for a downlink control channel message including an uplink grant associated with a second HARQ ID, and determining, based on the first HARQ ID having a same value as the second HARQ ID, that the handover procedure is complete.

In some implementations of the method and apparatuses described herein, the method further includes receiving the downlink control channel message and transmitting the uplink transmission based on receiving the downlink control channel message. To selectively transmit the uplink transmission, the method further includes canceling, based on failing to receive the downlink control channel message, the uplink transmission. The method further includes receiving, prior to transmitting the first control signaling, second control signaling indicating scheduling information corresponding to the first control signaling, the first control signaling transmitted in accordance with the scheduling information corresponding to the first control signaling. The second control signaling includes an RRC reconfiguration message. The method further includes transmitting, in accordance with the scheduling information and based on failing to receive the downlink control channel message, a retransmission of the first control signaling. The method further includes initiating a timer based on transmitting the first control signaling, where the retransmission is transmitted until expiry of the timer.

The method further includes receiving, in response to the retransmission of the first control signaling, the downlink control channel message including scheduling information for the uplink transmission, where the first HARQ ID is the same as the second HARQ ID and transmitting the uplink transmission based on receiving the downlink control channel message. The method further includes receiving second control signaling indicating the target base station, the target base station selected from a plurality of candidate target base stations, where executing the handover procedure between the serving base station and the target base station is based on receiving the second control signaling. The second control signaling includes a lower layer mobility command message. Additionally, or alternatively, the second control signaling includes one or more of a target frequency of the target base station, a cell identity of the target base station, a physical beam indication, or a timing advance to be used for transmission of the first control signaling. The method further includes receiving the downlink control channel message, the downlink control channel message associated with a C-RNTI, releasing one or more resources associated with transmitting the first control signaling, and transmitting, using the uplink grant, second control signaling. The second control signaling includes the C-RNTI.

Additionally, or alternatively, the second control signaling includes a parameter indicating the handover procedure is complete. Additionally, or alternatively, the second control signaling includes a measurement report based on a measurement configuration associated with the serving base station. The method further includes receiving signaling indicating scheduling information for an additional uplink transmission, the signaling associated with a third HARQ ID different from the first HARQ ID and continuing to monitor for the downlink control channel message. The method further includes receiving, prior to transmitting the first control signaling, second control signaling indicating configuration information associated with the downlink control channel message. The downlink control channel message includes an explicit indication that transmission of the first control signaling is successful. Additionally, or alternatively, reception of the downlink control channel message implicitly indicates that transmission of the first control signaling is successful. Additionally, or alternatively, the first control signaling includes an RRC reconfiguration complete message.

Some implementations of the method and apparatuses described herein may further include a target base station for wireless communication to monitor, based on executing a handover procedure between a serving base station and the target base station, for first control signaling indicating completion of the handover procedure, the first control signaling associated with a first HARQ ID, transmit, based on monitoring for the first control signaling, a downlink control channel message including an uplink grant associated with a second HARQ ID, where the first HARQ ID has a same value as the second HARQ ID, and receive, based on the uplink grant, an uplink transmission.

In some implementations of the method and apparatuses described herein, the target base station transmits, prior to receiving the first control signaling, second control signaling indicating scheduling information corresponding to the first control signaling, the monitoring for the first control signaling in accordance with the scheduling information corresponding to the first control signaling. The second control signaling includes an RRC reconfiguration message. The target base station receives, in accordance with the scheduling information, a retransmission of the first control signaling.

The target base station transmits, in response to the retransmission of the first control signaling, the downlink control channel message including the uplink grant, and receives the uplink transmission based on transmitting the downlink control channel message. The target base station fails to receive the first control signaling indicating completion of the handover procedure, wherein the downlink control channel message is associated with a C-RNTI, and wherein the first HARQ ID is different than the second HARQ ID, and receives, using the uplink grant, second control signaling. The second control signaling includes the C-RNTI.

Additionally, or alternatively, the second control signaling includes a parameter indicating the handover procedure is complete. Additionally, or alternatively, the second control signaling includes a measurement report based on a measurement configuration associated with the serving base station. The target base station transmits signaling indicating scheduling information for an additional uplink transmission, the signaling associated with a third HARQ ID different from the first HARQ ID, where the first HARQ ID is the same as the second HARQ ID. The downlink control channel message includes a feedback message acknowledging receipt of the first control signaling. Additionally, or alternatively, the downlink control channel message includes an explicit indication that reception of the first control signaling is successful. Additionally, or alternatively, transmission of the downlink control channel message implicitly indicates that reception of the first control signaling is successful. Additionally, or alternatively, the first control signaling includes an RRC reconfiguration complete message.

Some implementations of the method and apparatuses described herein may further include a method performed by a target base station, the method including: monitoring, based on executing a handover procedure between a serving base station and the target base station, for first control signaling indicating completion of the handover procedure, the first control signaling associated with a first HARQ ID, transmitting, based on monitoring for the first control signaling, a downlink control channel message including an uplink grant associated with a second HARQ ID, where the first HARQ ID has a same value as the second HARQ ID, and receiving, based on the uplink grant, an uplink transmission.

In some implementations of the method and apparatuses described herein, the method further includes transmitting, prior to receiving the first control signaling, second control signaling indicating scheduling information corresponding to the first control signaling, the monitoring for the first control signaling in accordance with the scheduling information corresponding to the first control signaling. The second control signaling includes an RRC reconfiguration message. The target base station receives, in accordance with the scheduling information, a retransmission of the first control signaling. The method further includes transmitting, in response to the retransmission of the first control signaling, the downlink control channel message including scheduling information for the uplink transmission, where the first HARQ ID is the same as the second HARQ ID and receiving the uplink transmission based on transmitting the downlink control channel message. The method further includes failing to receive the first control signaling indicating completion of the handover procedure, where the downlink control channel message is associated with a C-RNTI, and receiving, using the uplink grant, second control signaling. The second control signaling includes the C-RNTI.

Additionally, or alternatively, the second control signaling includes a parameter indicating the handover procedure is complete. Additionally, or alternatively, the second control signaling includes a measurement report based on a measurement configuration associated with the serving base station. The method further includes transmitting signaling indicating scheduling information for an additional uplink transmission, the signaling associated with a third HARQ ID different from the first HARQ ID, where the first HARQ ID is the same as the second HARQ ID. The downlink control channel message includes a feedback message acknowledging receipt of the first control signaling. Additionally, or alternatively, the downlink control channel message includes an explicit indication that reception of the first control signaling is successful. Additionally, or alternatively, transmission of the downlink control channel message implicitly indicates that reception of the first control signaling is successful. Additionally, or alternatively, the first control signaling includes an RRC reconfiguration complete message.

DETAILED DESCRIPTION

Figure 1:
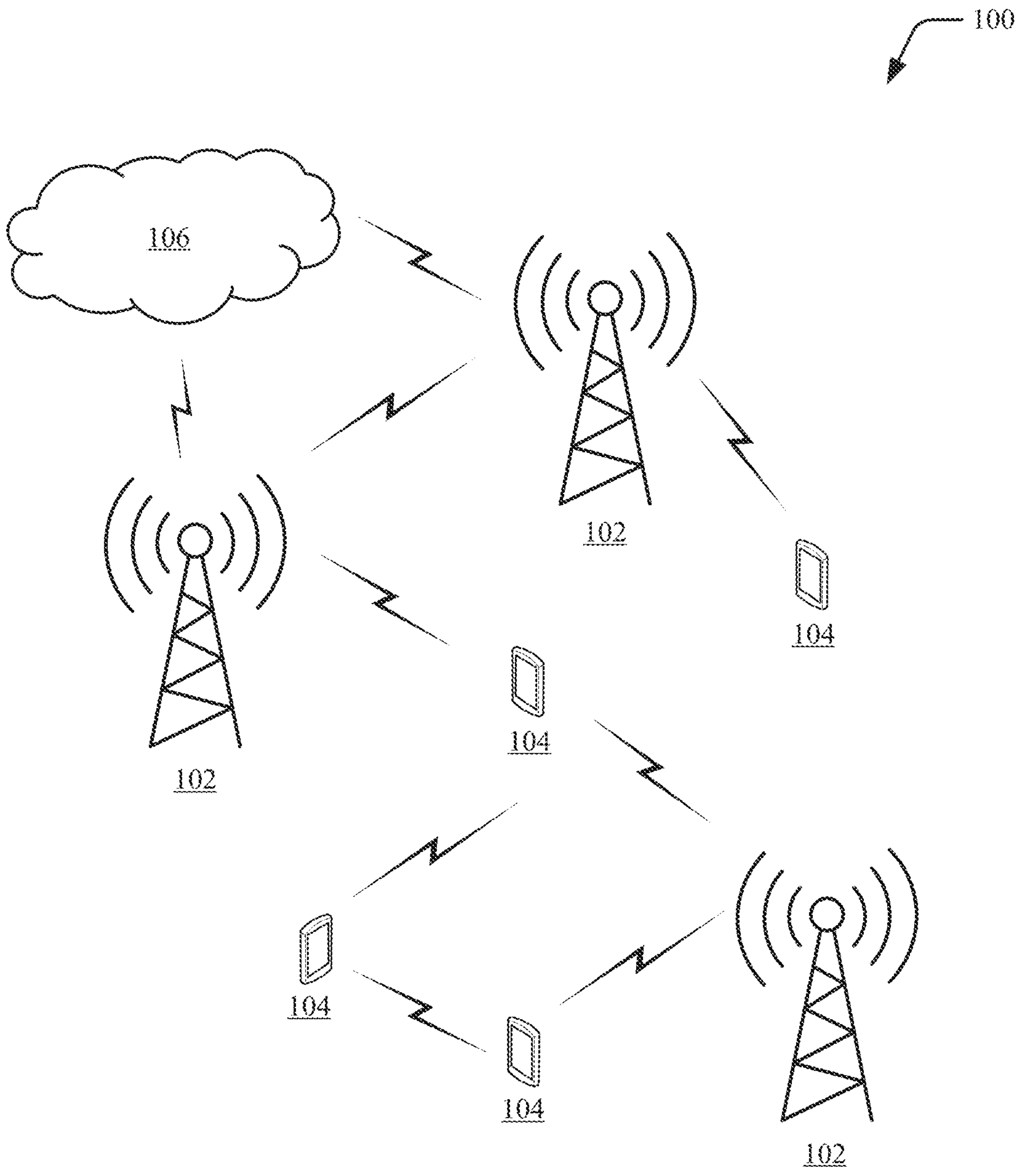
FIG. 1 illustrates an example of a wireless communications system in accordance with aspects of the present disclosure.

A UE in a wireless communications system may communicate with a base station or NE, which may be referred to as a serving base station or a serving NE. A base station may have a coverage area, or cell, which defines a geographical location in which the base station and a UE can communicate. The UE can be mobile and may travel outside of a coverage area of the serving base station (e.g., to a coverage area of a target base station), which may cause disruption in service for the UE. Thus, the UE, the serving base station, and a target base station can coordinate a handover procedure from the serving base station to the target base station. In some examples, the handover procedure includes a serving base station, the UE, or both monitoring one or more measurements, including signal strength measurements and signal quality measurements, to determine when to perform the handover procedure. When the measurements satisfy a threshold value, the network selects a target base station and initiates a handover procedure via control signaling. For example, the serving base station can transmit RRC signaling configuring one or more candidate base stations, the candidate base station and the UE may exchange synchronization signaling, and the serving base station may transmit a medium access control-control element (MAC-CE) triggering a switch between the serving base station and a target base station selected from the candidate base stations.

In response to the MAC-CE triggering the switch between the serving base station and the target base station, the UE can perform a random access procedure if the MAC-CE does not include a valid timing advance (TA). If the MAC-CE includes a valid TA, then the UE sends an uplink transmission to the target base station indicating that the handover procedure is complete. The UE can determine that the target base station received the uplink transmission. For example, the UE considers the handover procedure complete when the UE receives a downlink control channel message from the target base station addressed to the UE. However, in some examples, the target base station preemptively transmits a grant in a downlink control channel message addressed to the UE including scheduling resources prior to receiving the uplink transmission from the UE. Thus, the UE may not know if a first downlink control channel message received from a target base station is preemptively scheduling a new uplink transmission or confirming receipt of the uplink transmission. If the target base station preemptively schedules an uplink transmission, but the handover procedure is unsuccessful, then the UE can transmit the uplink transmission, causing communication errors due to the unsuccessful handover procedure.

To reduce unsuccessful handover procedures, the UE can include a HARQ process ID when transmitting a handover complete message. If a downlink control channel message from a target base station has a same HARQ process ID as the handover complete message, then the UE determines that the handover procedure is successful. If a downlink control channel message from a target base station has a different HARQ process ID than the handover complete message, then the UE may release one or more time-frequency resources used to transmit the handover complete message and may transmit additional messaging that indicates the handover completion using time-frequency resources indicated by the downlink control channel message. Additionally, or alternatively, the UE may ignore the downlink control channel message from the target base station that has a different HARQ process ID and continues to monitor for a downlink control channel message that has a same HARQ process ID as the handover complete message. In some cases, the UE performs one or more retransmissions of the handover complete message if the UE does not receive the downlink control channel message (e.g., until expiry of a timer or until receiving a downlink control channel message). Comparing a HARQ process ID from the handover complete message to a HARQ process ID from a downlink control channel message provides for the UE to determine whether a target base station is preemptively scheduling an uplink transmission or whether the target base station is scheduling an uplink transmission after receipt of the handover complete message, which improves communication reliability and reduces communication errors by ensuring a handover procedure is complete prior to a UE and a target base station communicating data transmissions.

Aspects of the present disclosure are described in the context of a wireless communications system.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a NR network, such as a 5G network, a 5G-Advanced (5G-A) network, or a 5G ultrawideband (5G-UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UEs 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N6, or another network interface). In some implementations, the NE 102 may communicate with each other directly. In some other implementations, the NE 102 may communicate with each other indirectly (e.g., via the CN 106). In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a packet data network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N6, or another network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally, or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., μ=0, μ=1, μ=2, μ=3, μ=4) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., OFDM symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., μ=0) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHZ), FR2 (24.25 GHz-52.6 GHz), FR3 (7.125 GHz-24.25 GHz), FR4 (52.6 GHz-114.25 GHZ), FR4a or FR4-1 (52.6 GHz-71 GHz), and FR5 (114.25 GHZ-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., μ=0), which includes 15 kHz subcarrier spacing; a second numerology (e.g., μ=1), which includes 30 kHz subcarrier spacing; and a third numerology (e.g., μ=2), which includes 60 kHz subcarrier spacing. FR2 may be associated with one or multiple numerologies (e.g., at least 2 numerologies). For example, FR2 may be associated with a third numerology (e.g., μ=2), which includes 60 kHz subcarrier spacing; and a fourth numerology (e.g., μ=3), which includes 120 kHz subcarrier spacing.

According to implementations, one or more of the NEs 102 and the UEs 104 are operable to implement various aspects of the techniques described with reference to the present disclosure. In some examples, a UE 104 can perform a handover procedure to switch from a serving NE 102 to a target NE 102, which is described in further detail with respect to FIG. 2. The UE 104 announces an arrival of the UE 104 to a coverage area, or cell, of a target NE 102, such as by sending a handover complete message to the target NE 102. In some cases, the target NE 102 can provide both a configured grant (CG) and dynamic grant (DG) time-frequency resource allocation to the UE 104. Thus, in some cases, the UE 104 may be unable to determine successful reception of an uplink data transmission by merely receiving a downlink control channel addressing a C-RNTI of the UE 104. For example, a UE 104 may be unable to determine if an uplink grant from a target NE 102 is proactively scheduling a new uplink transmission or if the uplink grant is in response to successful reception of a handover complete message (e.g., RRCReconfigurationComplete) at the target NE 102.

In some examples, a UE 104 may transmit a handover complete message to a target NE 102 using CG (e.g., configured earlier by a target NE 102 via a serving NE 102) that includes a HARQ process ID. If the UE receives a downlink control channel message addressed to the C-RNTI of the UE 104 with a matching HARQ process ID, then the UE 104 determines that the NE 102 successfully received the handover complete message. If the UE 104 monitors for a downlink control channel message but fails to receive the downlink control channel message during a monitoring window, then the UE 104 assumes that the target NE 102 has not received the handover complete message and may perform one or more retransmissions of the handover complete message. The UE 104 can use one or more CG resources (e.g., time-frequency resources) allocated by a serving NE 102 to transmit the retransmissions until expiry of a timer, where the timer is started or initiated when the UE 104 transmits an initial handover complete message. The target NE 102 can configure the duration of the timer via the serving NE 102. Additionally, or alternatively, the UE 104 can transmit retransmissions of the handover complete message until the UE 104 receives a DG allocating time-frequency resources for a new transmission. In some examples, upon receiving a DG, the UE releases CG resources configured by the target NE 102 and transmits control signaling indicating a handover complete message, which is described in further detail with respect to FIG. 3.

Figure 2:
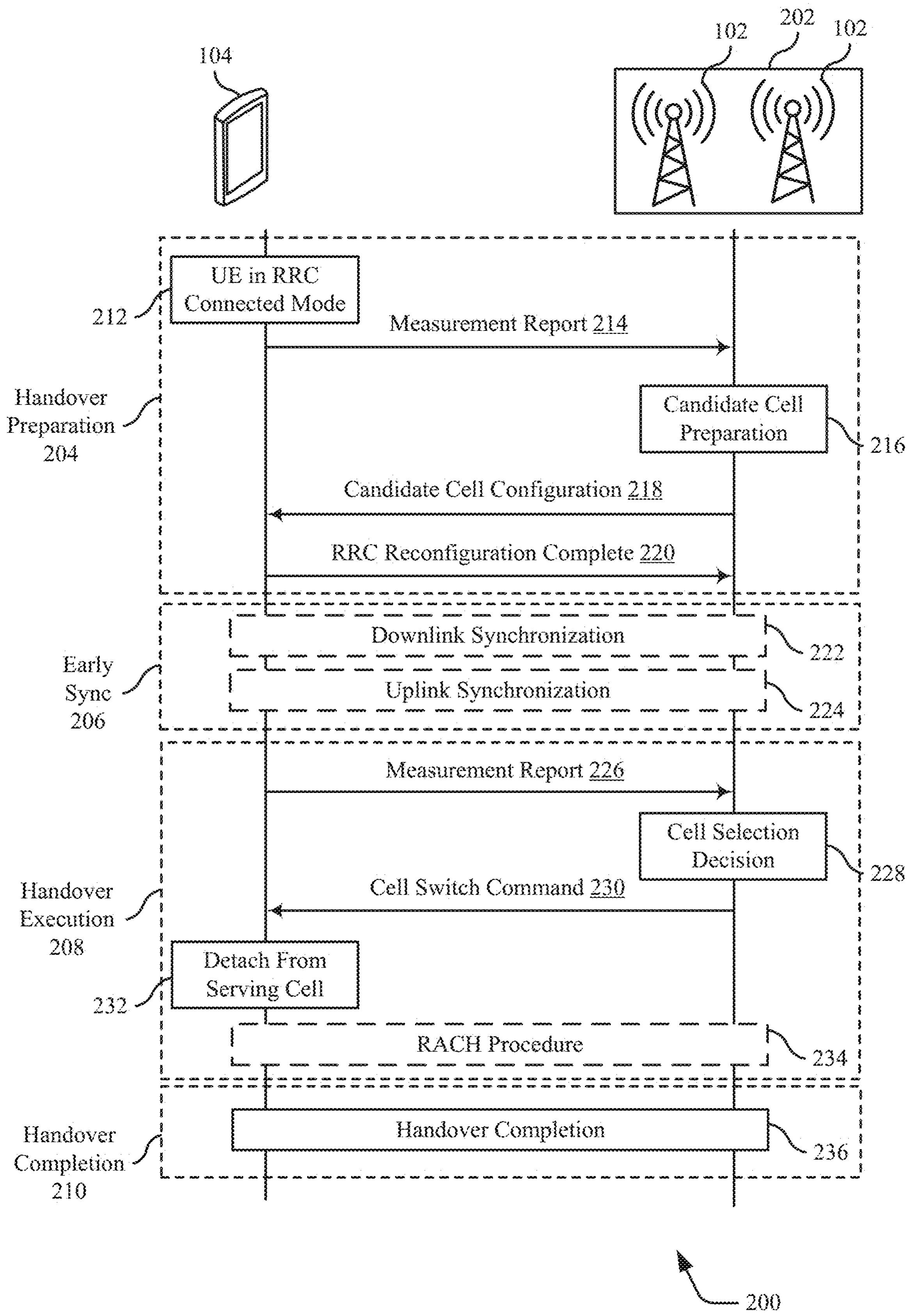
FIGS. 2 and 3 illustrate examples of signaling diagrams, in accordance with aspects of the present disclosure.

FIG. 2 illustrates an example of a signaling diagram 200 in accordance with aspects of the present disclosure. In some examples, the signaling diagram 200 may implement aspects of the wireless communications system 100. The signaling diagram 200 may illustrate an example of a UE 104 performing a handover procedure to switch from a serving NE 102, or source NE 102, to a target NE 102. The NEs 102 and the UE 104 may be examples of corresponding devices as described with reference to FIG. 1. Alternative examples of the following may be implemented, where some processes are performed in a different order than described or are not performed. In some cases, processes may include additional features not mentioned below, or further processes may be added.

In some examples, a UE 104 transmits and receives signaling to and from a NE 102, where the NE 102 can have one or more functionalities of a base station. For example, the UE 104 establishes a wireless connection with a NE 102, and exchanges data transmissions, control signaling, or both. Each NE 102 has a coverage area, which is a geographical location that defines a communication range for the NE 102. While the UE 104 is in the coverage area of a NE 102, which may also be referred to as a cell of the NE 102, the communications between the UE 104 and the NE 102 satisfy one or more criteria or thresholds (e.g., a quality of service (QoS) criteria including communication power and communication quality thresholds). If the UE 104 leaves the coverage area of the NE 102, then the communication quality may degrade, causing communication errors, latency, and inefficient resource allocation due to increased retransmission. Thus, the NE 102 and the UE 104 can perform a handover procedure, in which the UE 104 switches from a current base station with a current cell (e.g., a serving base station or serving cell) to a target base station with a target cell. That is, when the UE 104 moves from the coverage area of one NE 102 to another coverage area of a different NE 102, the UE 104 changes from a serving NE 102 to a target NE 102 due to the serving NE 102 no longer being a radio viable option.

In some cases, the handover procedure is triggered by one or more measurements, such as Layer 3 (L3) measurements. Layer 3, often called the network layer, is responsible for routing and forwarding data packets between different networks. Example L3 measurements include, but are not limited to, latency measurements, packet loss rate measurements, jitter measurements, throughput measurements, round-trip time (RTT) measurements, traffic load measurements, QoS parameters, and handover success rate, among others. If the measurements satisfy a threshold value for triggering a handover procedure, then the serving NE 102 transmits control signaling triggering a reconfiguration with synchronization to change a serving NE 102 to a target NE 102. In some examples, such as for carrier aggregation, changing a serving NE 102 includes changing a primary cell and secondary cell, as well as release or addition of secondary cells, when applicable. When a UE 104 uses multiple frequency bands or cells concurrently in carrier aggregation, a primary cell manages control functions and basic services, while secondary cells provide additional bandwidth and capacity for increasing signaling throughput. A UE 104 switching from a serving NE 102 to a target NE 102 includes Layer 1 (L1) and Layer 2 (L2) configuration resets (e.g., for transmitting data in the physical layer, L1, and framing data into packets in the data link layer, L2), which leads to increased latency, increased signaling overhead, and increased interruption time relative to beam switching.

Thus, to reduce latency, signaling overhead, and interruption time for handover procedures, a UE 104 switches a serving NE 102 using L1 and L2 signaling using a lower layer triggered mobility (LTM) handover procedure. For the LTM handover procedure, a cell switch command, or base station switch command, is conveyed in a MAC-CE, where the cell switch command includes information for performing the switch between NEs 102 or cells. For example, the UE 104 can coordinate with a group of NEs 202, which includes a serving NE 102 and a target NE 102, to perform a handover procedure. The handover procedure includes handover preparation at 204, early synchronization at 206, handover execution at 208, and handover completion at 210.

At 212, the handover preparation process includes determining that the UE 104 is in an RRC connected mode. An RRC connected mode is a state in which the UE 104 is actively communicating with a serving NE 102 and is engaged in data transmission, voice calls, or other services. In this mode, the UE 104 has successfully completed the connection setup procedures and has established a secure and continuous link with the cellular network.

At 214, the UE 104 transmits a measurement report to a serving NE 102. In some examples, the measurement report includes one or more reference signal measurements related to signal quality.

At 216, the serving NE 102 determines that one or more measurements reported by the UE 104 fail to satisfy a threshold value for continued communication with the serving NE 102. If the measurements fail to satisfy the threshold value, then the serving NE 102 initiates preparation of one or more candidate target NEs 102, or candidate cells, for a handover procedure. For example, the NE 102 can exchange signaling with one or more neighboring NEs 102 to determine which NEs 102 satisfy the threshold value for communication with the UE 104. The NEs 102 coordinate to select one or more candidate target NEs 102 for the handover procedure.

At 218, the serving NE 102 transmits an RRC reconfiguration message including a candidate cell configuration to the UE 104. The candidate cell configuration can include the one or more candidate NEs 102 selected at 216 for the UE 104 to switch to during the handover procedure.

At 220, the UE 104 stores the candidate NEs 102 in the candidate cell configuration and transmits an RRC reconfiguration complete message to the serving NE 102. The RRC reconfiguration complete message indicates to the NE 102 that the candidate cell configuration is received successfully.

In some examples, at 222, the UE 104 performs downlink synchronization with one or more candidate NEs 102 from the candidate cell configuration prior to receiving a cell switch command.

Additionally, or alternatively, at 224, the UE 104 performs uplink synchronization with one or more candidate NEs 102 from the candidate cell configuration. For example, the UE 104 can perform early TA acquisition with candidate NEs 102 requested by the network before receiving a cell switch command. The TA acquisition includes receiving a downlink control channel (e.g., physical downlink control channel (PDCCH)) from the serving NE 102 that triggers a contention free random access (CFRA) procedure. The UE 104 transmits a preamble towards candidate NEs 102 indicated in the candidate cell configuration. To minimize the data interruption of the source NE 102 due to performing the CFRA with the candidate NEs 102, the UE 104 may not receive a random access response (RAR) with a TA value. Instead, the candidate NEs 102 may include the TA value in the cell switch command. The UE 104 may rely on network implementation for verifying TA validity (e.g., rather than maintaining the TA timer for the candidate NE 102).

At 226, the UE 104 performs L1 measurements on the configured candidate NEs 102 and may transmit lower-layer measurement reports to the serving NE 102. The L1 measurements include, but are not limited to, receive signal strength indicator (RSSI) measurements, signal-to-noise ratio (SNR) measurements, channel quality indicators (CQIs), and modulation and coding scheme (MCS) measurements, among others. In some cases, the UE 104 performs the L1 measurements for a duration specified by the RRC reconfiguration at 218.

At 228, the serving NE 102 determines to execute a cell switch to a target cell, or to a target NE 102. For example, the NE 102 compares the L1 measurements to a threshold value and determines to execute the cell switch to a target NE 102 if the comparison satisfies the threshold value.

At 230, the serving NE 102 transmits a cell switch command to the UE 104. In some cases, the NE 102 transmits the cell switch command in control signaling, such as in a MAC-CE. The control signaling can include a candidate configuration index of the target cell or target NE 102. Additionally, or alternatively, the cell switch command can include identification of the target NE 102 including target frequency and cell identity, a physical beam indication, a TA to be used for transmitting the handover complete message to the target NE 102, or any combination thereof.

At 232, the UE 104 detaches from the serving cell (e.g., from the serving NE 102), and switches to a target cell (e.g., a target NE 102) by using the configuration indicated by the candidate configuration index.

In some examples, at 234, the UE 104 performs a random access channel (RACH) procedure to establish communications with the target NE 102. For example, if a TA of the target NE 102 is unknown to the UE 104, then the UE 104 initiates a RACH procedure with the target NE 102. In some other examples, if the UE 104 performs uplink synchronization at 224 and receives an indication of a TA for the target NE 102 in the cell switch command at 230, or otherwise receives an indication of a TA for the target NE 102, then the UE 104 may not perform a RACH procedure with the target NE 102.

At 236, the UE 104 completes the handover procedure. For example, the UE 104 may transmit control signaling to the target NE 102 indicating the handover procedure is complete (e.g., an RRCReconfigurationComplete message) after each handover execution. If the UE 104 and the target NE 102 perform a RACH procedure at 234, then the UE 104 considers the handover procedure successfully complete when the RACH procedure is successfully complete. If the UE 104 and the target NE 102 do not perform a RACH procedure at 234, then the UE 104 considers the handover procedure successfully complete when the UE 104 determines that the network has successfully receive an initial uplink transmission from the UE 104. For example, the UE 104 determines successful reception of initial uplink data by receiving a downlink control channel message addressing a C-RNTI of the UE 104 from the target NE 102.

In some examples, the UE 104 performs subsequent handover procedures (e.g., LTM handover procedures) by repeating the early synchronization at 206, the handover execution at 208, and the handover completion at 210 without releasing other candidate cell configurations after each handover completion.

In some examples, a target NE 102 transmits a downlink control channel message to the UE 104 during the handover completion at 210 that includes an uplink grant scheduling a new transmission. The uplink grant can be a CG or a DG specifying one or more time-frequency resources for the UE 104 to use for an uplink transmission. A CG, also known as a scheduled grant, is a resource allocation method where a NE 102 pre-assigns time-frequency resources to a UE 104 for data transmission. These resources are allocated based on network policies and scheduling decisions made by the NE 102. A DG, also known as on-demand grant or contention-based grant, is a resource allocation method where a NE 102 allocates time-frequency resources to a UE 104 on a per-demand basis. A target NE 102 can transmit both CG and DG time-frequency resources to the UE 104 anticipated to arrive in a cell of the target NE 102.

The UE 104 may be unable to determine successful reception of the uplink data merely by receiving a downlink control channel message addressing the C-RNTI of the UE 104 in the target cell. For example, the target NE 102 can proactively schedule a new uplink transmission by transmitting a DG in a downlink control channel message to the UE 104 prior to receiving a handover complete message from the UE 104. Thus, the UE 104 may be unable to determine if the downlink control channel message is proactively scheduling the new uplink transmission or if the downlink control channel message is in response to the handover complete message. Consequently, the UE 104 may also be unable to determine whether the handover procedure is successful, which may result in communication errors, increased latency, and inefficient resource allocation due to the UE 104 communicating with a target NE 102 that the UE 104 has not successfully switched to.

In some examples, to obviate possible ambiguity at the UE 104, a target NE 102 can provide one of CG or DG resources to the UE 104 to announce the arrival of the UE 104 to the target cell. For example, a NE 102 transmits a DG when the UE 104 arrives to the target cell, and otherwise transmits CGs, such that receiving a DG indicates to the UE 104 that the NE 102 received the handover complete message. Similarly, if the NE 102 determines not to use CGs, then a DG for a new transmission with a toggled new data indicator (NDI) field indicates to the UE 104 that the NE 102 received the handover complete message. However, using one of CG or DG resources has one or more disadvantages. For example, a NE 102 may want to reduce a numerical quantity of CG time-frequency resources allocated in an RRC reconfiguration message, and therefore can provide a CG resource with relatively increased periodicity, which may cause the UE 104 to wait longer before transmitting an indication of arrival to the target cell.

Thus, to increase communication reliability, latency, and efficiency of resource utilization while using both CG and DG resource allocation, a UE 104 transmits the handover complete message with a HARQ process ID. If the UE 104 receives a downlink control channel message from a target NE 102 with a matching HARQ process ID, then the UE 104 determines that the handover procedure is successful. In some cases, if the UE 104 receives a downlink control channel message from a target NE 102 with a HARQ process ID that does not match a HARQ process ID of the handover complete message, such as for a downlink control channel message proactively allocating DG resources for a new uplink transmission from the UE 104, then the UE 104 can release one or more CG resources of the target NE 102 and transmit control signaling indicating handover completion information to the NE 102 using the DG resources, which is described in further detail with respect to FIG. 3. In some other cases, if the UE 104 receives a downlink control channel message from a target NE 102 with a HARQ process ID that does not match a HARQ process ID of the handover complete message, then the UE 104 can ignore the downlink control channel message and continue to monitor for a downlink control channel message that matches the HARQ process ID of the handover complete message, which is described in further detail with respect to FIG. 3.

In some examples, once the handover completion is confirmed by the UE 104, the UE 104 transmits an uplink transmission using time-frequency resources allocated by the downlink control channel message. In some cases, if the UE 104 fails to confirm that the handover procedure is complete, then the UE 104 cancels an uplink transmission to the target NE 102. The UE 104 can perform another handover procedure to attempt to establish a connection with the target NE 102.

Figure 3:
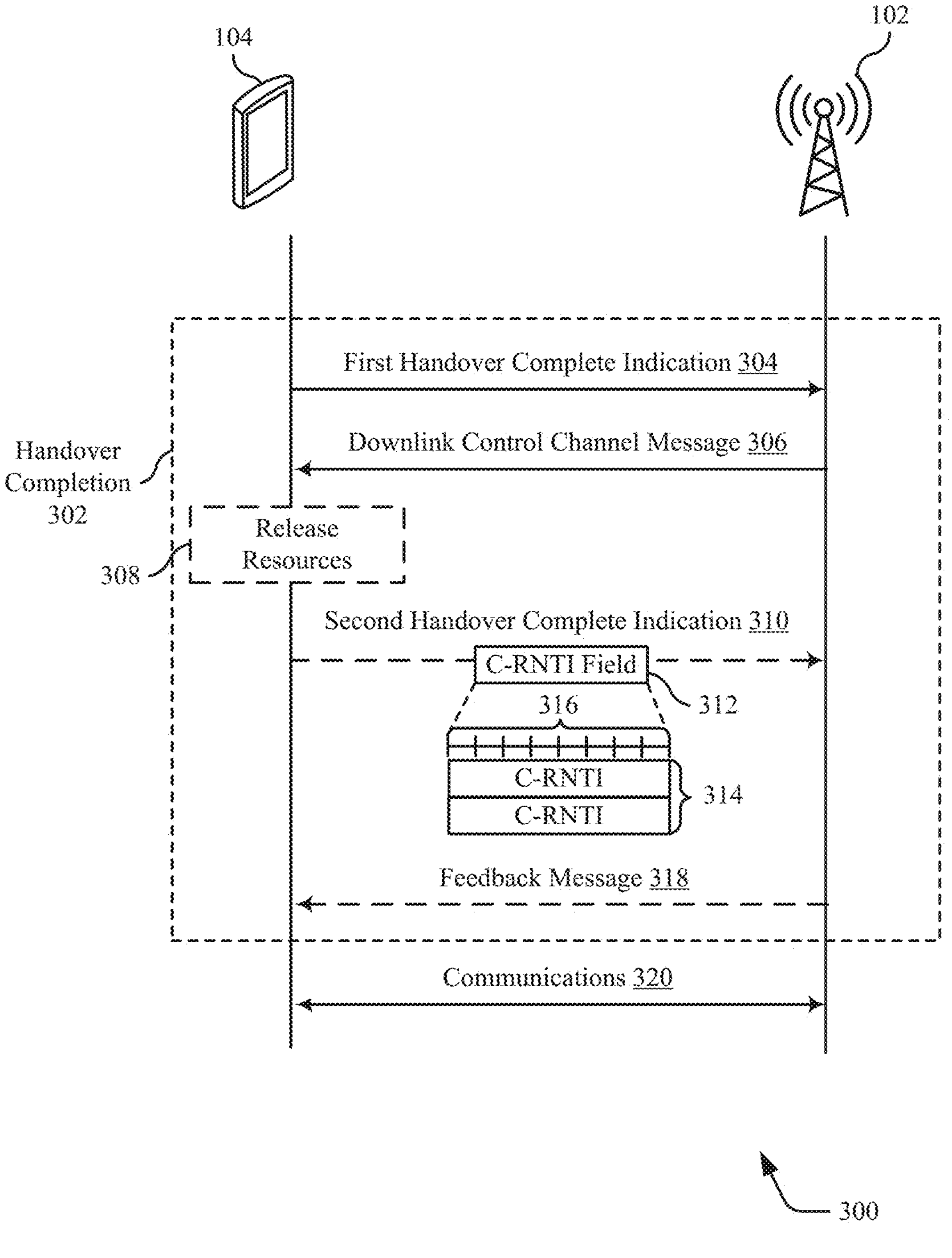

FIG. 3 illustrates an example of a signaling diagram 300 in accordance with aspects of the present disclosure. In some examples, the signaling diagram 300 may implement aspects of the wireless communications system 100 and the signaling diagram 200. The signaling diagram 300 may illustrate an example of a UE 104 performing a handover completion procedure to verify that a switch from a serving NE 102, or source NE 102, to a target NE 102 is successful. The NE 102 and the UE 104 may be examples of corresponding devices as described with reference to FIGS. 1 and 2. Alternative examples of the following may be implemented, where some processes are performed in a different order than described or are not performed. In some cases, processes may include additional features not mentioned below, or further processes may be added.

In some examples, after performing a handover execution, such as a handover execution described with reference to FIG. 2, a UE 104 verifies a handover procedure is successful in a handover completion at 302.

At 304, the UE 104 transmits a first handover completion indication to a target NE 102. In some cases, a NE 102 allocates one or more time-frequency resources to the UE 104 to use for a handover completion indication, such as via a downlink control channel message including a CG or a DG allocating time-frequency resources. A serving NE 102 provides downlink control channel configuration information (e.g., PDCCH configuration information) for a target NE 102 while the UE 104 is in the serving cell of the serving NE 102. For example, a serving NE 102 can transmit control resource set (CORESET) information and/or a search space configuration to the UE 104 via an RRC reconfiguration message that includes a candidate cell configuration, as described with reference to FIG. 2.

In some cases, the UE 104 transmits the first handover complete message to a target NE 102 using an uplink grant (e.g., CG or DG), where the handover complete message indicates a HARQ process ID. For example, the UE 104 transmits the handover complete message to the target NE 102 using one or more time-frequency resources allocated by a CG (e.g., configured earlier by a target NE 102 via the source NE 102).

In some cases, at 306, the UE 104 monitors for and receives a downlink control channel message (e.g., a PDCCH message) from a target NE 102. The downlink control channel message can be addressed to a same C-RNTI as the first handover complete indication from the UE 104. In some cases, the downlink control channel message includes an uplink grant (e.g., a CG or DG) allocating one or more time-frequency resources for an uplink transmission.

In some examples, the downlink control channel message includes a same HARQ process ID as the handover complete message. If a HARQ process ID of the downlink control channel message matches the HARQ process ID used for the transmission of the handover complete message, then the UE 104 determines that the target NE 102 has received the handover complete message, and that the handover is successfully completed.

In some other examples, the UE 104 monitors for the downlink control channel message but may not receive the downlink control channel message during a monitoring time period or window. Additionally, or alternatively, the UE 104 monitors for and receives a downlink control channel message that does not have a same HARQ process ID as the handover complete message. If the UE 104 does not receive the downlink control channel message and/or if the HARQ process ID of the downlink control channel message is different from the HARQ process ID used for the transmission of the handover complete message, then the UE 104 can retransmit the handover complete message. For example, the UE 104 initiates a timer upon transmitting the first handover complete message at 304, and the UE 104 performs retransmissions of the handover complete message until expiry of the timer or until a downlink control channel message is received (e.g., regardless of whether the HARQ process ID matches). In some examples, the target NE 102 transmits an indication to the UE 104 configuring the timer via control signaling sent by the serving NE 102.

In some examples, at 308, if the UE 104 receives a downlink control channel message that does not have a same HARQ process ID as the handover complete message, then the UE 104 releases one or more time-frequency resources the UE 104 is using to transmit the first handover completion indication at 304. The downlink control channel message can include a DG allocating time-frequency resources for an uplink transmission.

In some cases, at 310, the UE 104 transmits a second handover completion indication using the time-frequency resources allocated by the DG. For example, the UE 104 transmits control signaling indicating that the handover procedure is complete. In some examples, the control signaling is a MAC-CE including a C-RNTI field 312, where the MAC-CE is identified by a MAC subheader with a logic channel ID (LCID). The MAC-CE can have a fixed size and can include a single field (e.g., the C-RNTI field 312). The single field includes the C-RNTI 314 of the MAC entity. In some examples, the C-RNTI field 312 can have a length defined by a numerical quantity of bits 316, such as 16 bits. In some cases, a NE 102 transmits an RRC reconfiguration message that configures the UE 104 to transmit the MAC-CE with the C-RNTI field 312. In some other examples, the control signaling is a MAC-CE dedicated to indicating the handover procedure is complete. The MAC-CE can have a reserved LCID that indicates the handover is complete. In some other examples, the control signaling includes an RRC measurement report. The UE 104 can transmit the RRC measurement report if the UE 104 received a measurement configuration for the target NE 102 while the UE 104 was in the serving cell or source cell. The RRC measurement report is secured (e.g., ciphered and integrity protected) using one or more keys specified by the serving NE 102 in the serving cell.

In some examples, at 318, the UE 104 receives a feedback message from the target NE 102. In some cases, the feedback message includes a HARQ acknowledgement (ACK) that indicates the second handover complete indication is successfully received by the target NE 102. Once the UE 104 receives the feedback message that indicates the second handover complete indication is received by the NE 102, the UE 104 considers the handover procedure successfully completed.

In some examples, if the UE 104 receives a downlink control channel message that has a different HARQ process ID from the first handover complete indication before expiry of the timer, the UE 104 ignores the downlink control channel message and continues to monitor for a downlink control channel message with a HARQ process ID that is the same as the first handover complete indication.

In some cases, the target NE 102 transmits an explicit indication to the UE 104 informing the UE 104 that a handover complete indication has been received (e.g., the first handover complete indication or the second handover complete indication). The target NE 102 can include the explicit indication in a downlink control channel message (e.g., addressed to the C-RNTI of the UE 104) that indicates an uplink grant for a new transmission or in a downlink MAC-CE with a reserved LCID. In some cases, the NE 102 transmits the indication that the handover complete indication has been received as a modification to an existing field in a downlink control information message or in a downlink MAC-CE, as a new field in a downlink control channel message or in a MAC-CE, or the like.

In some other cases, the target NE 102 implicitly indicates to the UE 104 that the handover complete message has been received. For example, the target NE 102 transmits an RRC reconfiguration message to the UE 104, which implicitly indicates that the target NE 102 has received the handover complete message. Upon receiving the RRC reconfiguration message addressed to the UE 104 (e.g., a PDCCH addressed to a C-RNTI of the UE 104), the UE 104 concludes that the target NE 102 has received the handover complete message, releases time-frequency resources allocated by a previously configured CG and considers the target NE 102 as a source NE 102 or serving NE 102.

Upon determining the handover is successfully completed, at 320, the UE 104 communicates with the NE 102 using the uplink grant included in the downlink control channel message. For example, the UE 104 performs an uplink transmission to the NE 102 using the uplink grant included in the downlink control channel message.

Figure 4:
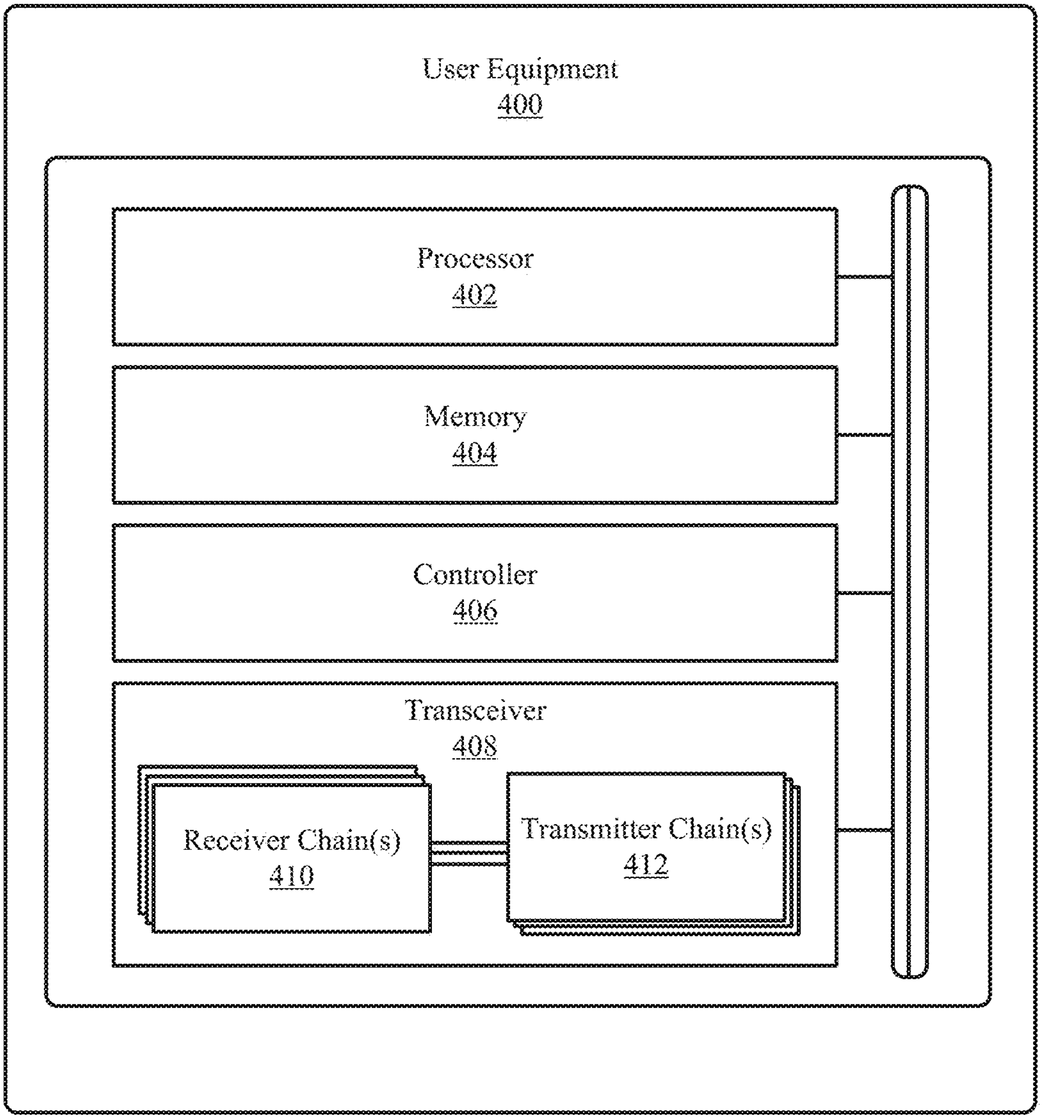
FIG. 4 illustrates an example of a UE in accordance with aspects of the present disclosure.

FIG. 4 illustrates an example of a UE 400 in accordance with aspects of the present disclosure. The UE 400 may include a processor 402, a memory 404, a controller 406, and a transceiver 408. The processor 402, the memory 404, the controller 406, or the transceiver 408, or various combinations thereof or various components thereof may be examples of means for performing various aspects of the present disclosure as described herein. These components may be coupled (e.g., operatively, communicatively, functionally, electronically, electrically) via one or more interfaces.

The processor 402, the memory 404, the controller 406, or the transceiver 408, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 402 may include an intelligent hardware device (e.g., a general-purpose processor, a DSP, a CPU, an ASIC, an FPGA, or any combination thereof). In some implementations, the processor 402 may be configured to operate the memory 404. In some other implementations, the memory 404 may be integrated into the processor 402. The processor 402 may be configured to execute computer-readable instructions stored in the memory 404 to cause the UE 400 to perform various functions of the present disclosure.

The memory 404 may include volatile or non-volatile memory. The memory 404 may store computer-readable, computer-executable code including instructions when executed by the processor 402 cause the UE 400 to perform various functions described herein. The code may be stored in a non-transitory computer-readable medium such as the memory 404 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 402 and the memory 404 coupled with the processor 402 may be configured to cause the UE 400 to perform one or more of the functions described herein (e.g., executing, by the processor 402, instructions stored in the memory 404). For example, the processor 402 may support wireless communication at the UE 400 in accordance with examples as disclosed herein. The UE 400 may be configured to or operable to support a means for transmitting, based on executing a handover procedure between a serving base station and a target base station, first control signaling indicating completion of the handover procedure, the first control signaling associated with a first HARQ ID, monitoring, in response to the first control signaling, for a downlink control channel message including an uplink grant associated with a second HARQ ID, and determining, based on the first HARQ ID having a same value as the second HARQ ID, that the handover procedure is complete.

Additionally, or alternatively, the UE 400 may be configured to or operable to support any one or combination of the monitoring for the downlink control channel message includes receiving the downlink control channel message, and transmitting, using the scheduling information, an indication of successful completion of lower layer mobility based on receiving the downlink control channel message. Selectively transmitting the uplink transmission includes canceling, based on failing to receive the downlink control channel message, the uplink transmission. The method further including receiving, prior to transmitting the first control signaling, second control signaling indicating scheduling information corresponding to the first control signaling, the first control signaling transmitted in accordance with the scheduling information corresponding to the first control signaling. The second control signaling includes an RRC reconfiguration message. The method further including transmitting, in accordance with the scheduling information and based on failing to receive the downlink control channel message, a retransmission of the first control signaling.

The method further including initiating a timer based on transmitting the first control signaling, where the retransmission is transmitted until expiry of the timer. The method further including receiving, in response to the retransmission of the first control signaling, the downlink control channel message including scheduling information for the uplink transmission, where the first HARQ ID is the same as the second HARQ ID and transmitting the uplink transmission based on receiving the downlink control channel message. The method further including receiving second control signaling indicating the target base station, the target base station selected from a plurality of candidate target base stations, where executing the handover procedure between the serving base station and the target base station is based on receiving the second control signaling. In some examples, the second control signaling includes a lower layer mobility command message. In some other examples, the second control signaling includes one or more of a target frequency of the target base station, a cell identity of the target base station, a physical beam indication, or a timing advance to be used for transmission of the first control signaling. The method further including receiving the downlink control channel message, the downlink control channel message associated with a C-RNTI, releasing one or more resources associated with transmitting the first control signaling, and transmitting, using the uplink grant, second control signaling.

In some examples, the second control signaling includes the C-RNTI. In some examples, the second control signaling includes a parameter indicating the handover procedure is complete. In some examples, the second control signaling includes a measurement report based on a measurement configuration associated with the serving base station. The method further including receiving signaling indicating scheduling information for an additional uplink transmission, the signaling associated with a third HARQ ID different from the first HARQ ID and continuing to monitor for the downlink control channel message. The method further including receiving, prior to transmitting the first control signaling, second control signaling indicating configuration information associated with the downlink control channel message. In some examples, the downlink control channel message includes an explicit indication that transmission of the first control signaling is successful. In some examples, reception of the downlink control channel message implicitly indicates that transmission of the first control signaling is successful. In some examples, the first control signaling includes an RRC reconfiguration complete message.

Additionally, or alternatively, the UE 400 may support at least one memory and at least one processor coupled with the at least one memory and configured to cause the UE to: transmit, based on executing a handover procedure between a serving base station and a target base station, first control signaling indicating completion of the handover procedure, the first control signaling associated with a first HARQ ID, monitor, in response to the first control signaling, for a downlink control channel message including an uplink grant associated with a second HARQ ID, and determine, based on the first HARQ ID having a same value as the second HARQ ID, that the handover procedure is complete.

Additionally, the UE 400 may be configured to support any one or combination of the at least one processor configured to, when monitoring for the downlink control channel message, receive the downlink control channel message, and transmit, using the scheduling information, an indication of successful completion of lower layer mobility based on receiving the downlink control channel message. Selectively transmitting the uplink transmission includes canceling, based on failing to receive the downlink control channel message, the uplink transmission. The UE 400 may be configured to support the at least one processor configured to receive, prior to transmitting the first control signaling, second control signaling indicating scheduling information corresponding to the first control signaling, the first control signaling transmitted in accordance with the scheduling information corresponding to the first control signaling. The second control signaling includes an RRC reconfiguration message. The UE 400 may be configured to support the at least one processor configured to transmit, in accordance with the scheduling information and based on failing to receive the downlink control channel message, a retransmission of the first control signaling.

The UE 400 may be configured to support the at least one processor configured to initiate a timer based on transmitting the first control signaling, where the retransmission is transmitted until expiry of the timer. The UE 400 may be configured to support the at least one processor configured to receive, in response to the retransmission of the first control signaling, the downlink control channel message including scheduling information for the uplink transmission, where the first HARQ ID is the same as the second HARQ ID, and transmit the uplink transmission based on receiving the downlink control channel message. The UE 400 may be configured to support the at least one processor configured to receive second control signaling indicating the target base station, the target base station selected from a plurality of candidate target base stations, where executing the handover procedure between the serving base station and the target base station is based on receiving the second control signaling. In some examples, the second control signaling includes a lower layer mobility command message. In some other examples, the second control signaling includes one or more of a target frequency of the target base station, a cell identity of the target base station, a physical beam indication, or a timing advance to be used for transmission of the first control signaling.

The UE 400 may be configured to support the at least one processor configured to receive the downlink control channel message, the downlink control channel message associated with a C-RNTI, release one or more resources associated with transmitting the first control signaling, and transmit, using the uplink grant, second control signaling. In some examples, the second control signaling includes the C-RNTI. In some examples, the second control signaling includes a parameter indicating the handover procedure is complete. In some examples, the second control signaling includes a measurement report based on a measurement configuration associated with the serving base station. The UE 400 may be configured to support the at least one processor configured to receive signaling indicating scheduling information for an additional uplink transmission, the signaling associated with a third HARQ ID different from the first HARQ ID and continue to monitor for the downlink control channel message. The UE 400 may be configured to support the at least one processor configured to receive, prior to transmitting the first control signaling, second control signaling indicating configuration information associated with the downlink control channel message. In some examples, the downlink control channel message includes an explicit indication that transmission of the first control signaling is successful. In some examples, reception of the downlink control channel message implicitly indicates that transmission of the first control signaling is successful. In some examples, the first control signaling includes an RRC reconfiguration complete message.

The controller 406 may manage input and output signals for the UE 400. The controller 406 may also manage peripherals not integrated into the UE 400. In some implementations, the controller 406 may utilize an operating system such as iOS®, ANDROID®, WINDOWS®, or other operating systems. In some implementations, the controller 406 may be implemented as part of the processor 402.

In some implementations, the UE 400 may include at least one transceiver 408. In some other implementations, the UE 400 may have more than one transceiver 408. The transceiver 408 may represent a wireless transceiver. The transceiver 408 may include one or more receiver chains 410, one or more transmitter chains 412, or a combination thereof.

A receiver chain 410 may be configured to receive signals (e.g., control information, data, packets) over a wireless medium. For example, the receiver chain 410 may include one or more antennas to receive a signal over the air or wireless medium. The receiver chain 410 may include at least one amplifier (e.g., a low-noise amplifier (LNA)) configured to amplify the received signal. The receiver chain 410 may include at least one demodulator configured to demodulate the receive signal and obtain the transmitted data by reversing the modulation technique applied during transmission of the signal. The receiver chain 410 may include at least one decoder for decoding the demodulated signal to receive the transmitted data.

A transmitter chain 412 may be configured to generate and transmit signals (e.g., control information, data, packets). The transmitter chain 412 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 412 may also include at least one power amplifier configured to amplify the modulated signal to an appropriate power level suitable for transmission over the wireless medium. The transmitter chain 412 may also include one or more antennas for transmitting the amplified signal into the air or wireless medium.

Figure 5:
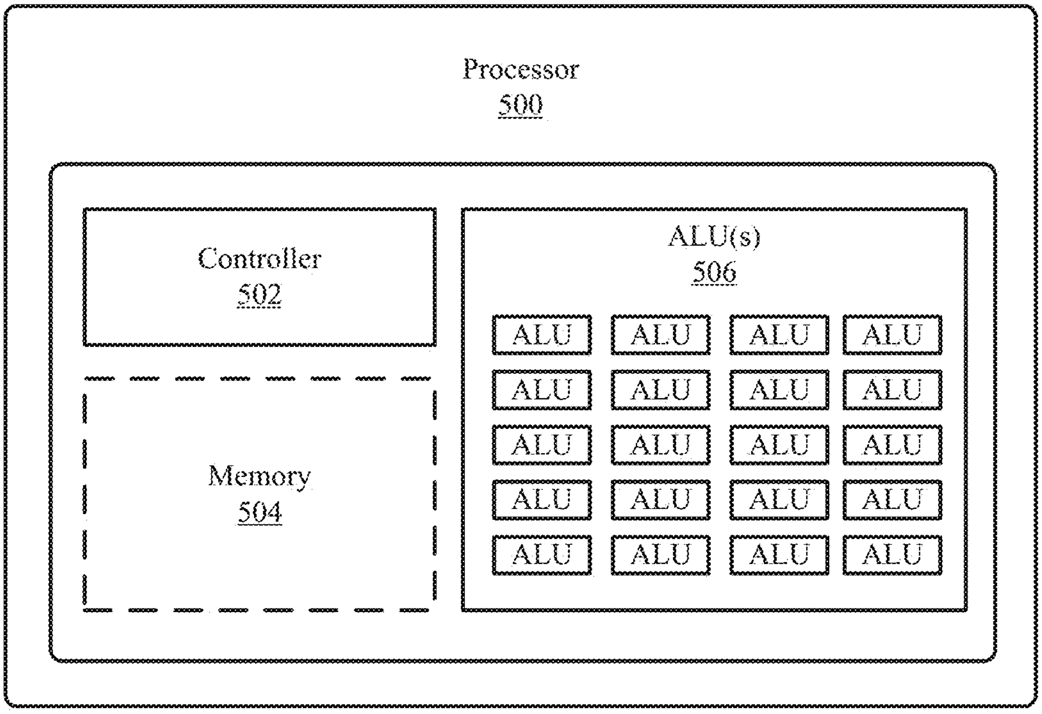
FIG. 5 illustrates an example of a processor in accordance with aspects of the present disclosure.

FIG. 5 illustrates an example of a processor 500 in accordance with aspects of the present disclosure. The processor 500 may be an example of a processor configured to perform various operations in accordance with examples as described herein. The processor 500 may include a controller 502 configured to perform various operations in accordance with examples as described herein. The processor 500 may optionally include at least one memory 504, which may be, for example, an L1/L2/L3 cache. Additionally, or alternatively, the processor 500 may optionally include one or more arithmetic-logic units (ALUs) 506. One or more of these components may be in electronic communication or otherwise coupled (e.g., operatively, communicatively, functionally, electronically, electrically) via one or more interfaces (e.g., buses).

The processor 500 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 500) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 502 may be configured to manage and coordinate various operations (e.g., signaling, receiving, obtaining, retrieving, transmitting, outputting, forwarding, storing, determining, identifying, accessing, writing, reading) of the processor 500 to cause the processor 500 to support various operations in accordance with examples as described herein. For example, the controller 502 may operate as a control unit of the processor 500, generating control signals that manage the operation of various components of the processor 500. These control signals include enabling or disabling functional units, selecting data paths, initiating memory access, and coordinating timing of operations.

The controller 502 may be configured to fetch (e.g., obtain, retrieve, receive) instructions from the memory 504 and determine subsequent instruction(s) to be executed to cause the processor 500 to support various operations in accordance with examples as described herein. The controller 502 may be configured to track memory addresses of instructions associated with the memory 504. The controller 502 may be configured to decode instructions to determine the operation to be performed and the operands involved. For example, the controller 502 may be configured to interpret the instruction and determine control signals to be output to other components of the processor 500 to cause the processor 500 to support various operations in accordance with examples as described herein. Additionally, or alternatively, the controller 502 may be configured to manage flow of data within the processor 500. The controller 502 may be configured to control transfer of data between registers, ALUs 506, and other functional units of the processor 500.

The memory 504 may include one or more caches (e.g., memory local to or included in the processor 500 or other memory, such as RAM, ROM, DRAM, SDRAM, SRAM, MRAM, flash memory, etc. In some implementations, the memory 504 may reside within or on a processor chipset (e.g., local to the processor 500). In some other implementations, the memory 504 may reside external to the processor chipset (e.g., remote to the processor 500).

The memory 504 may store computer-readable, computer-executable code including instructions that, when executed by the processor 500, cause the processor 500 to perform various functions described herein. The code may be stored in a non-transitory computer-readable medium such as system memory or another type of memory. The controller 502 and/or the processor 500 may be configured to execute computer-readable instructions stored in the memory 504 to cause the processor 500 to perform various functions. For example, the processor 500 and/or the controller 502 may be coupled with or to the memory 504, the processor 500, and the controller 502, and may be configured to perform various functions described herein. In some examples, the processor 500 may include multiple processors and the memory 504 may include multiple memories. One or more of the multiple processors may be coupled with one or more of the multiple memories, which may, individually or collectively, be configured to perform various functions herein.

The one or more ALUs 506 may be configured to support various operations in accordance with examples as described herein. In some implementations, the one or more ALUs 506 may reside within or on a processor chipset (e.g., the processor 500). In some other implementations, the one or more ALUs 506 may reside external to the processor chipset (e.g., the processor 500). One or more ALUs 506 may perform one or more computations such as addition, subtraction, multiplication, and division on data. For example, one or more ALUs 506 may receive input operands and an operation code, which determines an operation to be executed. One or more ALUs 506 may be configured with a variety of logical and arithmetic circuits, including adders, subtractors, shifters, and logic gates, to process and manipulate the data according to the operation. Additionally, or alternatively, the one or more ALUs 506 may support logical operations such as AND, OR, exclusive-OR (XOR), not-OR (NOR), and not-AND (NAND), enabling the one or more ALUs 506 to handle conditional operations, comparisons, and bitwise operations.

The processor 500 may support wireless communication in accordance with examples as disclosed herein. The processor 500 may be configured to or operable to support at least one controller coupled with at least one memory and configured to cause the processor to: transmit, based on executing a handover procedure between a serving base station and a target base station, first control signaling indicating completion of the handover procedure, the first control signaling associated with a first HARQ ID, monitor, in response to the first control signaling, for a downlink control channel message including an uplink grant associated with a second HARQ ID, and determine, based on the first HARQ ID having a same value as the second HARQ ID, that the handover procedure is complete.

Additionally, or alternatively, the processor 500 may be configured to or operable to support any one or combination of, to monitor for the downlink control channel message, the at least one controller is configured to cause the processor to receive the downlink control channel message, and transmit, using the scheduling information, an indication of successful completion of lower layer mobility based on receiving the downlink control channel message. To selectively transmit the uplink transmission, the at least one controller is configured to cause the processor to cancel, based on failing to receive the downlink control channel message, the uplink transmission. The at least one controller is configured to cause the processor to receive, prior to transmitting the first control signaling, second control signaling indicating scheduling information corresponding to the first control signaling, the first control signaling transmitted in accordance with the scheduling information corresponding to the first control signaling. In some examples, the second control signaling includes an RRC reconfiguration message. The at least one controller is configured to cause the processor to transmit, in accordance with the scheduling information and based on failing to receive the downlink control channel message, a retransmission of the first control signaling. The at least one controller is configured to cause the processor to initiate a timer based on transmitting the first control signaling, where the retransmission is transmitted until expiry of the timer. The at least one controller is configured to cause the processor to receive, in response to the retransmission of the first control signaling, the downlink control channel message including scheduling information for the uplink transmission, where the first HARQ ID is the same as the second HARQ ID and transmit the uplink transmission based on receiving the downlink control channel message.

The at least one controller is configured to cause the processor to receive second control signaling indicating the target base station, the target base station selected from a plurality of candidate target base stations, where executing the handover procedure between the serving base station and the target base station is based on receiving the second control signaling. In some examples, the second control signaling includes a lower layer mobility command message. In some other examples, the second control signaling includes one or more of a target frequency of the target base station, a cell identity of the target base station, a physical beam indication, or a timing advance to be used for transmission of the first control signaling. The at least one controller is configured to cause the processor to receive the downlink control channel message, the downlink control channel message associated with a C-RNTI, release one or more resources associated with transmitting the first control signaling, and transmit, using the uplink grant, second control signaling. In some examples, the second control signaling includes the C-RNTI. In some examples, the second control signaling includes a parameter indicating the handover procedure is complete. In some examples, the second control signaling includes a measurement report based on a measurement configuration associated with the serving base station.

The at least one controller is configured to cause the processor to receive signaling indicating scheduling information for an additional uplink transmission, the signaling associated with a third HARQ ID different from the first HARQ ID and continue to monitor for the downlink control channel message. The at least one controller is configured to cause the processor to receive, prior to transmitting the first control signaling, second control signaling indicating configuration information associated with the downlink control channel message. In some examples, the downlink control channel message includes an explicit indication that transmission of the first control signaling is successful. In some examples, reception of the downlink control channel message implicitly indicates that transmission of the first control signaling is successful. In some examples, the first control signaling includes an RRC reconfiguration complete message.

Figure 6:
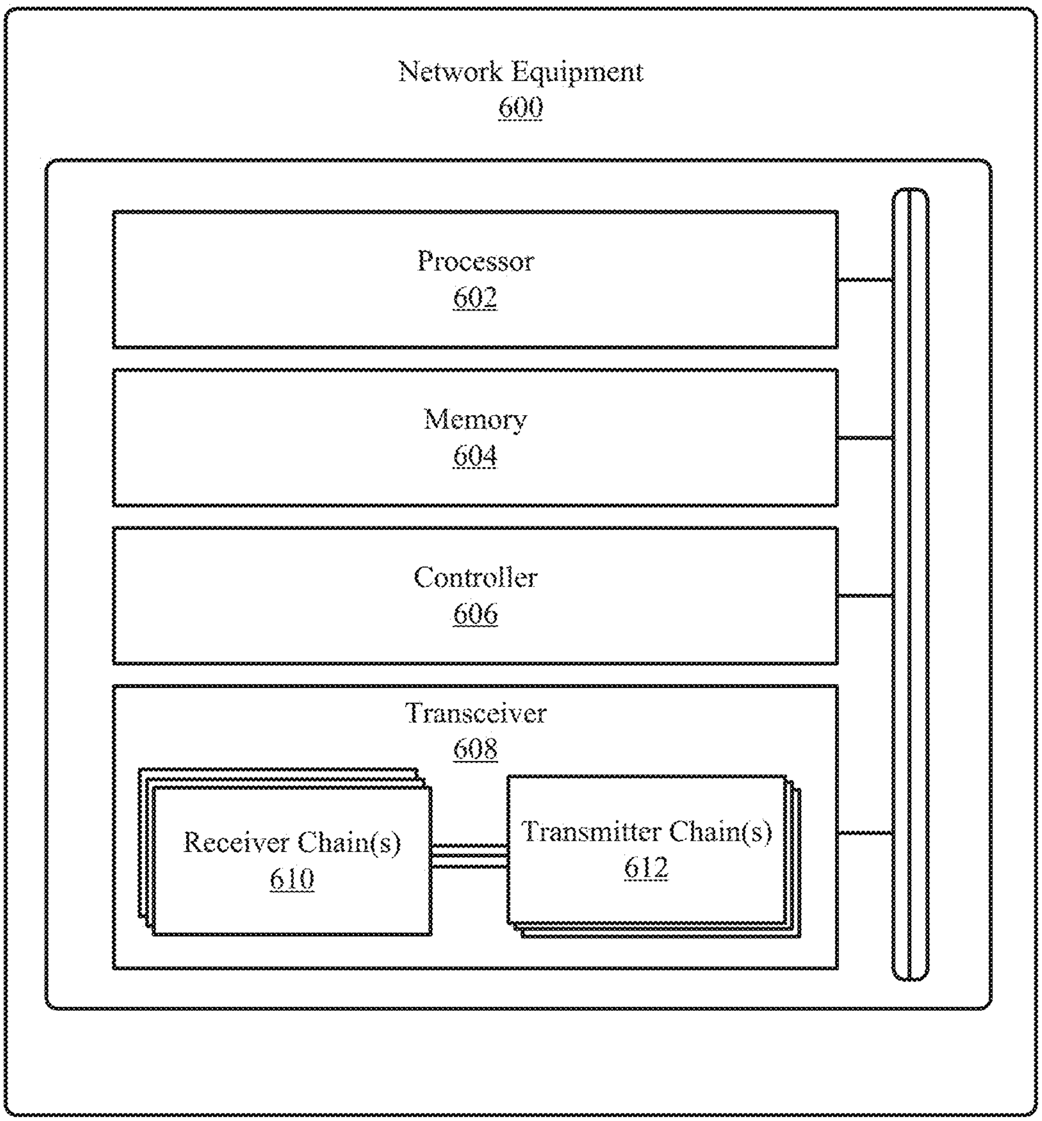
FIG. 6 illustrates an example of a network equipment (NE) in accordance with aspects of the present disclosure.

FIG. 6 illustrates an example of a NE 600 in accordance with aspects of the present disclosure. The NE 600 may include a processor 602, a memory 604, a controller 606, and a transceiver 608. The processor 602, the memory 604, the controller 606, or the transceiver 608, or various combinations thereof or various components thereof may be examples of means for performing various aspects of the present disclosure as described herein. These components may be coupled (e.g., operatively, communicatively, functionally, electronically, electrically) via one or more interfaces.

The processor 602, the memory 604, the controller 606, or the transceiver 608, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 602 may include an intelligent hardware device (e.g., a general-purpose processor, a DSP, a CPU, an ASIC, an FPGA, or any combination thereof). In some implementations, the processor 602 may be configured to operate the memory 604. In some other implementations, the memory 604 may be integrated into the processor 602. The processor 602 may be configured to execute computer-readable instructions stored in the memory 604 to cause the NE 600 to perform various functions of the present disclosure.

The memory 604 may include volatile or non-volatile memory. The memory 604 may store computer-readable, computer-executable code including instructions when executed by the processor 602 cause the NE 600 to perform various functions described herein. The code may be stored in a non-transitory computer-readable medium such as the memory 604 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 602 and the memory 604 coupled with the processor 602 may be configured to cause the NE 600 to perform one or more of the functions described herein (e.g., executing, by the processor 602, instructions stored in the memory 604). For example, the processor 602 may support wireless communication at the NE 600 in accordance with examples as disclosed herein. The NE 600 may be configured to or operable to support means for monitoring, based on executing a handover procedure between a serving base station and the target base station, for first control signaling indicating completion of the handover procedure, the first control signaling associated with a first HARQ ID, transmitting, based on monitoring for the first control signaling, a downlink control channel message including an uplink grant associated with a second HARQ ID, where the first HARQ ID has a same value as the second HARQ ID, and receiving, based on the uplink grant, an uplink transmission.

Additionally, or alternatively, the NE 600 may be configured to or operable to support means for transmitting, prior to receiving the first control signaling, second control signaling indicating scheduling information corresponding to the first control signaling, the monitoring for the first control signaling in accordance with the scheduling information corresponding to the first control signaling. In some examples, the second control signaling includes an RRC reconfiguration message. In some examples, the NE 600 may be configured to or operable to support means for receiving, in accordance with the scheduling information, a retransmission of the first control signaling. In some examples, the NE 600 may be configured to or operable to support means for transmitting, in response to the retransmission of the first control signaling, the downlink control channel message including the uplink grant, and receiving the uplink transmission based on transmitting the downlink control channel message.

Additionally, or alternatively, the NE 600 may be configured to or operable to support means for failing to receive the first control signaling indicating completion of the handover procedure, where the downlink control channel message is associated with a C-RNTI, and receiving, using the uplink grant, second control signaling. In some examples, the second control signaling includes the C-RNTI. In some examples, the second control signaling includes a parameter indicating the handover procedure is complete. In some examples, the second control signaling includes a measurement report based on a measurement configuration associated with the serving base station.

Additionally, or alternatively, the NE 600 may be configured to or operable to support means for transmitting signaling indicating scheduling information for an additional uplink transmission, the signaling associated with a third HARQ ID different from the first HARQ ID, where the first HARQ ID is the same as the second HARQ ID. In some examples, the downlink control channel message includes a feedback message acknowledging receipt of the first control signaling. In some examples, the downlink control channel message includes an explicit indication that reception of the first control signaling is successful. In some examples, transmission of the downlink control channel message implicitly indicates that reception of the first control signaling is successful. In some examples, the first control signaling includes an RRC reconfiguration complete message.

Additionally, or alternatively, the NE 600 may support at least one memory and at least one processor coupled with the at least one memory and configured to cause the NE 600 to monitor, based on executing a handover procedure between a serving base station and the target base station, for first control signaling indicating completion of the handover procedure, the first control signaling associated with a first HARQ ID, transmit, based on monitoring for the first control signaling, a downlink control channel message including an uplink grant associated with a second HARQ ID, where the first HARQ ID has a same value as the second HARQ ID, and receive, based on the uplink grant, an uplink transmission.

Additionally, the NE 600 may be configured to support any one or combination of the at least one processor is configured to cause the NE 600 to transmit, prior to receiving the first control signaling, second control signaling indicating scheduling information corresponding to the first control signaling, the monitoring for the first control signaling in accordance with the scheduling information corresponding to the first control signaling. In some examples, the second control signaling includes an RRC reconfiguration message. In some examples, the NE 600 may be configured to support the at least one processor configured to cause the NE 600 to receive, in accordance with the scheduling information, a retransmission of the first control signaling. In some examples, the NE 600 may be configured to support the at least one processor configured to cause the NE 600 to transmit, in response to the retransmission of the first control signaling, the downlink control channel message including the uplink grant, and receiving the uplink transmission based on transmitting the downlink control channel message.

Additionally, or alternatively, the NE 600 may be configured to support the at least one processor configured to cause the NE 600 to fail to receive the first control signaling indicating completion of the handover procedure, where the downlink control channel message is associated with a C-RNTI, and receive, using the uplink grant, second control signaling. In some examples, the second control signaling includes the C-RNTI. In some examples, the second control signaling includes a parameter indicating the handover procedure is complete. In some examples, the second control signaling includes a measurement report based on a measurement configuration associated with the serving base station.

Additionally, or alternatively, the NE 600 may be configured to support the at least one processor configured to cause the NE 600 to transmit signaling indicating scheduling information for an additional uplink transmission, the signaling associated with a third HARQ ID different from the first HARQ ID, where the first HARQ ID is the same as the second HARQ ID. In some examples, the downlink control channel message includes a feedback message acknowledging receipt of the first control signaling. In some examples, the downlink control channel message includes an explicit indication that reception of the first control signaling is successful. In some examples, transmission of the downlink control channel message implicitly indicates that reception of the first control signaling is successful. In some examples, the first control signaling includes an RRC reconfiguration complete message.

The controller 606 may manage input and output signals for the NE 600. The controller 606 may also manage peripherals not integrated into the NE 600. In some implementations, the controller 606 may utilize an operating system such as iOS®, ANDROID®, WINDOWS®, or other operating systems. In some implementations, the controller 606 may be implemented as part of the processor 602.

In some implementations, the NE 600 may include at least one transceiver 608. In some other implementations, the NE 600 may have more than one transceiver 608. The transceiver 608 may represent a wireless transceiver. The transceiver 608 may include one or more receiver chains 610, one or more transmitter chains 612, or a combination thereof.

A receiver chain 610 may be configured to receive signals (e.g., control information, data, packets) over a wireless medium. For example, the receiver chain 610 may include one or more antennas to receive a signal over the air or wireless medium. The receiver chain 610 may include at least one amplifier (e.g., a low-noise amplifier (LNA)) configured to amplify the received signal. The receiver chain 610 may include at least one demodulator configured to demodulate the receive signal and obtain the transmitted data by reversing the modulation technique applied during transmission of the signal. The receiver chain 610 may include at least one decoder for decoding the demodulated signal to receive the transmitted data.

A transmitter chain 612 may be configured to generate and transmit signals (e.g., control information, data, packets). The transmitter chain 612 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 612 may also include at least one power amplifier configured to amplify the modulated signal to an appropriate power level suitable for transmission over the wireless medium. The transmitter chain 612 may also include one or more antennas for transmitting the amplified signal into the air or wireless medium.

Figure 7:
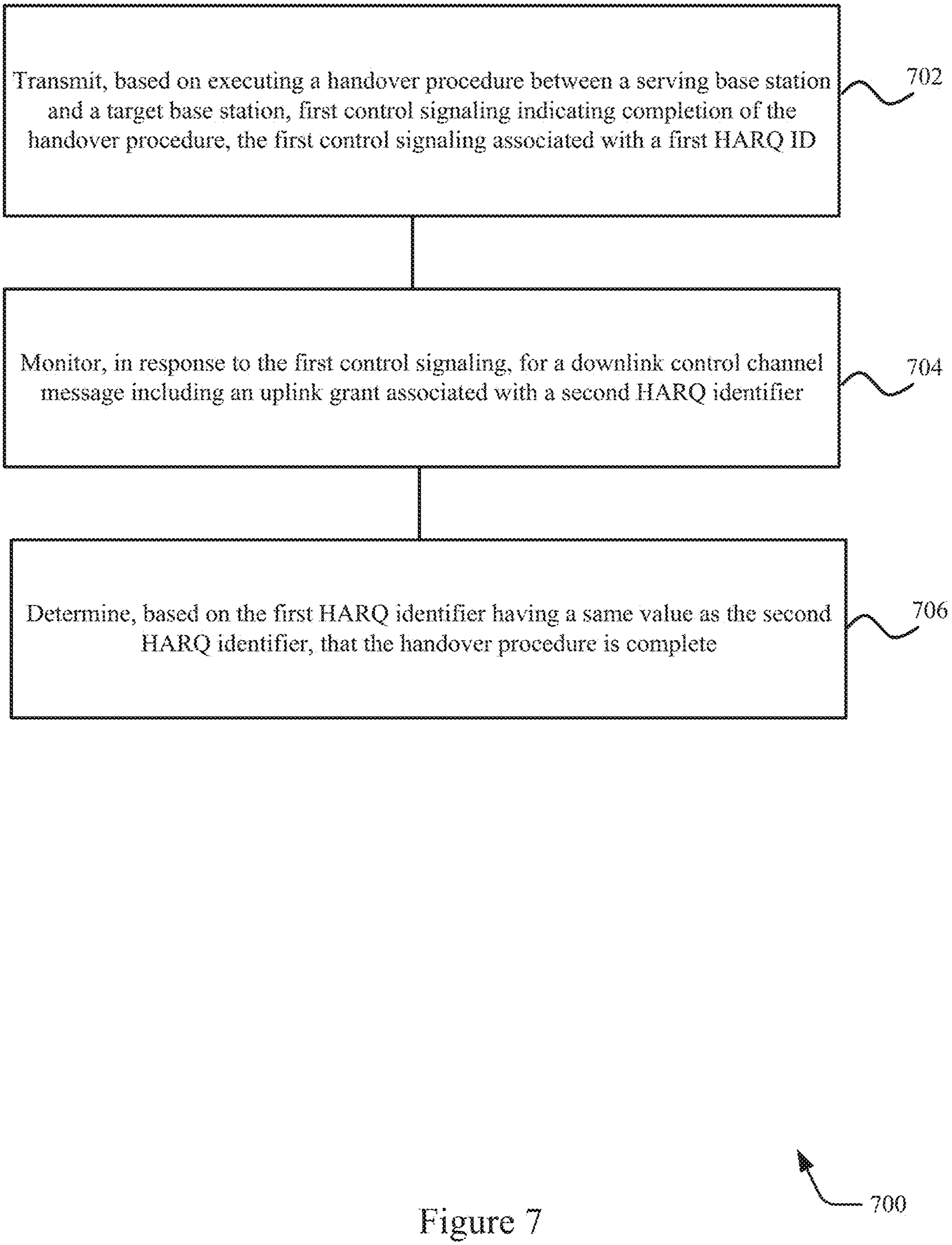
FIG. 7 illustrates a flowchart of a method performed by a UE in accordance with aspects of the present disclosure.

FIG. 7 illustrates a flowchart of a method 700 in accordance with aspects of the present disclosure. The operations of the method may be implemented by a UE as described herein. In some implementations, the UE may execute a set of instructions to control the function elements of the UE to perform the described functions. It should be noted that the method described herein describes a possible implementation, and that the operations and the steps may be rearranged or otherwise modified and that other implementations are possible.

At 702, the method may include transmit, based on executing a handover procedure between a serving base station and a target base station, first control signaling indicating completion of the handover procedure, the first control signaling associated with a first HARQ ID. The operations of 702 may be performed in accordance with examples as described herein. In some implementations, aspects of the operations of 702 may be performed by a UE as described with reference to FIG. 4.

At 704, the method may include monitoring, in response to the first control signaling, for a downlink control channel message including an uplink grant associated with a second HARQ ID. The operations of 704 may be performed in accordance with examples as described herein. In some implementations, aspects of the operations of 704 may be performed by a UE as described with reference to FIG. 4.

At 706, the method may include determining, based on the first HARQ ID having a same value as the second HARQ ID, that the handover procedure is complete. The operations of 706 may be performed in accordance with examples as described herein. In some implementations, aspects of the operations of 706 may be performed by a UE as described with reference to FIG. 4.

Figure 8:
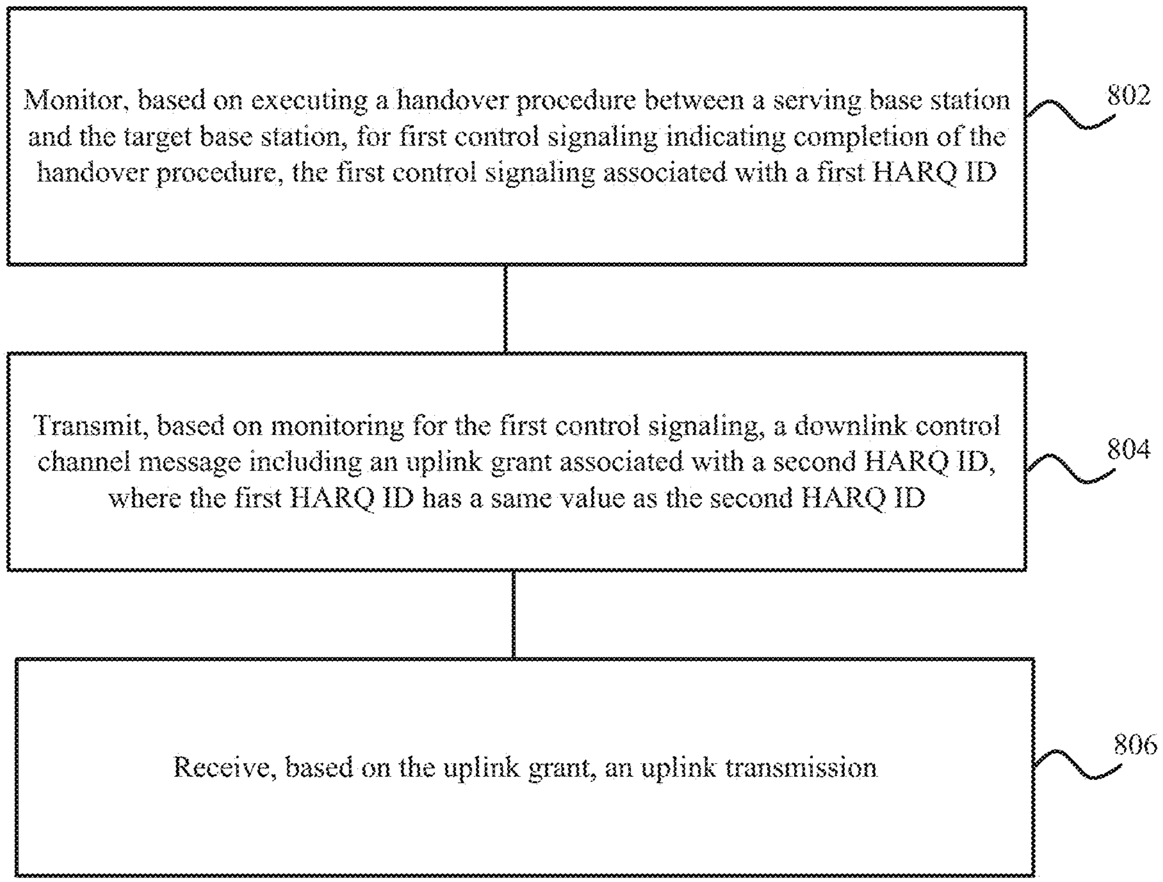
FIG. 8 illustrates a flowchart of a method performed by a NE in accordance with aspects of the present disclosure.

FIG. 8 illustrates a flowchart of a method 800 in accordance with aspects of the present disclosure. The operations of the method may be implemented by a NE as described herein. In some implementations, the NE may execute a set of instructions to control the function elements of the NE to perform the described functions. It should be noted that the method described herein describes a possible implementation, and that the operations and the steps may be rearranged or otherwise modified and that other implementations are possible.

At 802, the method may include monitoring, based on executing a handover procedure between a serving base station and the target base station, for first control signaling indicating completion of the handover procedure, the first control signaling associated with a first HARQ ID. The operations of 802 may be performed in accordance with examples as described herein. In some implementations, aspects of the operations of 802 may be performed by a NE as described with reference to FIG. 6.

At 804, the method may include transmitting, based on monitoring for the first control signaling, a downlink control channel message including an uplink grant associated with a second HARQ ID, where the first HARQ ID has a same value as the second HARQ ID. The operations of 804 may be performed in accordance with examples as described herein. In some implementations, aspects of the operations of 804 may be performed by a NE as described with reference to FIG. 6.

At 806, the method may include receiving, based on the uplink grant, an uplink transmission. The operations of 806 may be performed in accordance with examples as described herein. In some implementations, aspects of the operations of 806 may be performed by a NE as described with reference to FIG. 6.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

at least one memory; and at least one processor coupled with the at least one memory and configured to cause the UE to:

transmit, based at least in part on executing a handover procedure between a serving base station and a target base station, first control signaling indicating completion of the handover procedure, the first control signaling associated with a first hybrid automatic repeat request (HARQ) identifier;

monitor, in response to the first control signaling, for a downlink control channel message comprising an uplink grant associated with a second HARQ identifier; and determine, based at least in part on the first HARQ identifier having a same value as the second HARQ identifier, that the handover procedure is complete.

2. The UE of claim 1, wherein the at least one processor is configured to cause the UE to receive a lower layer mobility command, wherein the first control signaling is transmitted responsive to the lower layer mobility command.

3. The UE of claim 1, wherein the at least one processor is configured to cause the UE to cancel, based at least in part on failing to receive the downlink control channel message, an uplink transmission associated with the uplink grant.

4. The UE of claim 1, wherein the at least one processor is configured to cause the UE to transmit, based at least in part on receiving the downlink control channel message, an uplink transmission associated with the uplink grant.

5. The UE of claim 1, wherein the at least one processor is configured to cause the UE to receive, prior to transmitting the first control signaling, second control signaling indicating scheduling information corresponding to the first control signaling, the first control signaling transmitted in accordance with the scheduling information corresponding to the first control signaling.

6. The UE of claim 5, wherein the second control signaling comprises a radio resource control reconfiguration message.

7. The UE of claim 5, wherein the at least one processor is configured to cause the UE to transmit, in accordance with the scheduling information corresponding to the first control signaling and based at least in part on failing to receive the downlink control channel message, a retransmission of the first control signaling.

8. The UE of claim 7, wherein the at least one processor is configured to cause the UE to initiate a timer based at least in part on transmitting the first control signaling, wherein the retransmission is transmitted until expiry of the timer.

9. The UE of claim 7, wherein the at least one processor is configured to cause the UE to:

receive, in response to the retransmission of the first control signaling, the downlink control channel message; and transmit an uplink transmission associated with the uplink grant based at least in part on receiving the downlink control channel message.

10. The UE of claim 1, wherein the at least one processor is configured to cause the UE to receive second control signaling indicating the target base station, the target base station selected from a plurality of candidate target base stations, wherein executing the handover procedure between the serving base station and the target base station is based at least in part on receiving the second control signaling.

11. The UE of claim 10, wherein the second control signaling comprises a lower layer mobility command message.

12. The UE of claim 10, wherein the second control signaling comprises one or more of a target frequency of the target base station, a cell identity of the target base station, a physical beam indication, or a timing advance to be used for transmission of the first control signaling.

13. The UE of claim 1, wherein the at least one processor is configured to cause the UE to:

receive the downlink control channel message, the downlink control channel message associated with a cell-radio network temporary identifier (C-RNTI), wherein the first HARQ identifier is different than the second HARQ identifier;

release one or more resources associated with transmitting the first control signaling; and transmit, using the uplink grant, second control signaling.

14. The UE of claim 13, wherein the second control signaling comprises the C-RNTI.

15. The UE of claim 13, wherein the second control signaling comprises a parameter indicating the handover procedure is complete.

16. The UE of claim 13, wherein the second control signaling comprises a measurement report based at least in part on a measurement configuration associated with the serving base station.

17. The UE of claim 1, wherein the at least one processor is configured to cause the UE to:

receive signaling indicating scheduling information corresponding to an additional uplink transmission, the signaling associated with a third HARQ identifier different from the first HARQ identifier; and continue to monitor for the downlink control channel message.

18. A processor for wireless communication, comprising:

at least one controller coupled with at least one memory and configured to cause the processor to:

transmit, based at least in part on executing a handover procedure between a serving base station and a target base station, first control signaling indicating completion of the handover procedure, the first control signaling associated with a first hybrid automatic repeat request (HARQ) identifier;

monitor, in response to the first control signaling, for a downlink control channel message comprising an uplink grant associated with a second HARQ identifier; and determine, based at least in part on the first HARQ identifier having a same value as the second HARQ identifier, that the handover procedure is complete.

19. A method performed by a user equipment (UE), the method comprising:

transmitting, based on executing a handover procedure between a serving base station and a target base station, first control signaling indicating completion of the handover procedure, the first control signaling associated with a first hybrid automatic repeat request (HARQ) identifier;

monitoring, in response to the first control signaling, for a downlink control channel message comprising an uplink grant associated with a second HARQ identifier; and determining, based on the first HARQ identifier having a same value as the second HARQ identifier, that the handover procedure is complete.

20. A target base station for wireless communication, comprising:

at least one memory; and at least one processor coupled with the at least one memory and configured to cause the target base station to:

monitor, based on executing a handover procedure between a serving base station and the target base station, for first control signaling indicating completion of the handover procedure, the first control signaling associated with a first hybrid automatic repeat request (HARQ) identifier;

transmit, based at least in part on monitoring for the first control signaling, a downlink control channel message comprising an uplink grant associated with a second HARQ identifier, wherein the first HARQ identifier has a same value as the second HARQ identifier; and receive, based at least in part on the uplink grant, an uplink transmission.

* * * * *